US007014102B2

(12) United States Patent
Oohashi (10) Patent No.: US 7,014,102 B2
(45) Date of Patent: Mar. 21, 2006

(54) FACE IDENTIFICATION SYSTEM

(75) Inventor: Takahiro Oohashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/808,520

(22) Filed: Mar. 25, 2004

(65) Prior Publication Data

US 2004/0197014 A1    Oct. 7, 2004

(30) Foreign Application Priority Data

Apr. 1, 2003    (JP)    ............................ 2003-129613

(51) Int. Cl.
*G06K 9/00*    (2006.01)
(52) U.S. Cl. ...................................... 235/375; 382/118
(58) Field of Classification Search ........ 235/375–382, 235/439, 454; 382/115–119; 700/245
See application file for complete search history.

(56) References Cited

U.S. PATENT DOCUMENTS 5,012,522 A * 4/1991 Lambert .................... 382/118

6,516,247 B1 * 2/2003 Funada ....................... 700/245

FOREIGN PATENT DOCUMENTS

JP    2000-259834    9/2000

* cited by examiner

*Primary Examiner*—Michael G. Lee
*Assistant Examiner*—Jamara A. Franklin
(74) *Attorney, Agent, or Firm*—Squire, Sanders & Dempsey, L.L.P.

(57) ABSTRACT

A face identification system includes a face data generator to generate face data of an objective person and a face data register to register the face data to be stored in a temporary face data storage, which stores the face data as reference face data. The system also includes a face identifier to identify the face of the objective person by comparing the face data with the reference face data. The system also includes a robot mechanism to move to plural areas, a data base to store face data of plural persons and a controller to transmit the retrieved face data from the data base as reference face data to the robot. By this system configuration, the face identification can be correctly carried out and improved in its process speed.

8 Claims, 9 Drawing Sheets

| Time Zone / Area | A | B | C |
|---|---|---|---|
| a | ID 3<br>ID 5<br>ID 15 | ID 3<br>ID 5<br>ID 8 | ID 3<br>ID 2<br>ID 32 |
| b | ID 1<br>ID 42<br>ID 6 | ID 1<br>ID 4 | ID 16<br>ID 7 |
| c | ID 2<br>ID 8 | ID 13 | ID 4 |

FIG.5B

| Area | Correction Value of Brishtness in Time Zone A |
|---|---|
| a | +5 |
| b | -3 |
| c | -1 |

FACE IDENTIFICATION SYSTEM

FIELD OF THE INVENTION

The present invention relates to a face identification system to specify and identify the human faces.

BACKGROUND OF THE INVENTION

The conventional face identification systems have been proposed, wherein camera devices such as CCD cameras to take the images of the objective person are used and his or her face is specified and then identified by using such images (see the reference 1 as an example). In this system, many of images taken in a form of moving pictures of the objective person are compared with image data taken by the camera devices and then his or her images are specified and identified as a specific person among the persons whose images are stored in the image data base.

The recent progress of robot technologies is remarkable. Since some of the robots have carrier devices to go around extensive areas such as the insides of the different buildings or the yard of companies, they can be applied or "appointed" to receptionists or guides for the company visitors (see reference 1).

Reference 1:
Published Japanese Patent Application: JP, 2000-259834, A(2000)

BRIEF SUMMARY OF INVENTION

The robot which has such face identification system may carry out the complete sequence of the identification that is to compare a person's face with all of the stored face data by the system installed therein. This sequence of operation burdens a heavy load to the robotic system and therefore the computer process for the identification needs long time.

In the present invention, a face identification system for an effective process to realize high-speed identification is proposed.

In order to realize such high-speed identification, the face identification system comprises a robot which has a built-in sub-system (called "sub-system", hereinafter) and a face image data base system (called "data base", hereinafter) which is set up in a different place from the location of the robot and which supports and cooperates with the sub-system. The combination of the sub-system and the data base realizes such effective process for the high-speed face identification as a whole. The combination and cooperation are carried out through a communication channel.

In addition, for the present face identification system, the robot can take the environmental data of the place where the robot goes and stays. Therefore, the face image stored in the data base may be corrected to be a realistic image that is in such an environment so that a more successful identification may be possible. We call such correction as the environmental correction hereinafter. The probability information that the specific person to be identified should not be in the place where the robot has to specify and identify him or her is given beforehand and then he or she can be eliminated from a group of the possible persons to be processed for identification. Therefore, such information can improve the resultant identification efficiency since no judgment is necessary or provided for the person who does not exist at the specific place and in the time for the robot goes to and stay in. His or her presence can be determined before the face identification process starts. Therefore the probability information is a step for the data screening before the face identification process. The screening step contributes the high-speed processing for the face identification by reducing samples to be identified.

In order to carry out the face identification process, a combination of the sub-system and the data base work out. To begin with, it is necessary to specify the place and time where the robot stays and meet the person whose face is to be identified. By means of the sub-system built in the robot, the robot detects the information of the place and time where the person presently exists and then sends such information to the controller that manages the data base through the communication channel. The controller specifies the place where the robot is present on the basis of such information.

Since the present face identification system allows the robot to detect the place where the robot is present, the robot can specifies the location of his presence. By using the information of the robot location, he can request the reference face data of the persons who should be in the same area as he is present. The request is sent to the controller that manages the data base through the communication channel.

The probability of the person's presence depends on the time as well as the area. The robot requests the updated information in accordance with the change of the time zone of the list of persons who should be there or not be there. Such change may work as a trigger for the robot to take this action.

In this face identification system, the persons who are present in the area and at the time for which the robot locates are selected in the face identification process. Reversely the persons who are not present in the area and at the time for which the robot locates are screened out from the face identification process. In other words, the face data of the persons who are probably not present in such area in such a certain time are eliminated for the face identification process. Therefore this screening method can contribute to improving the identification. By using this screening method that is to select the concurrent presence of the person in an area and time zone with said robot, the necessary samples of the reference face data retrieved from the data base can be reduced and the high-speed face identification is realized.

The environmental data regarding the place where the robot is currently present are updated in accordance with the change of the time zone. The environmental data are specified for each change of the time zone and the reference face data are corrected by using such environmental data which are brightness of the illumination lighting the place where the robot is present.

In this face identification system, such corrected reference face data are compared with the face image that cameras in the robot acquire. Since the comparison is done in substantially same environmental condition, the system effectively supports to improve the face identification reliability.

The robot has a light sensor as well as cameras to take the image of faces. The robot sends the brightness information of the place where he is present to the controller by which the face data retrieved from the data base are corrected to be used as the reference face data.

The correction serves for the in-situ comparison that has the consistency with the face image to be taken in the place where the robot is present. Therefore the present system serves for improving the identification.

The data base includes plural skin tone parameters against the variations of the brightness of illumination lighting the area where each face is to be identified. The skin tone parameters retrieved from the data base are used as the information of the brightness of the place where the robot is present.

In the present face identification system, it is possible to compare and identify the specific person using appropriate skin tone parameters in response to the brightness of the place where he or she is present.

DETAILED DESCRIPTION OF THE INVENTION

The embodiments of the face identification system regarding the present invention are explained in details using drawings in the following.

Figure 1:
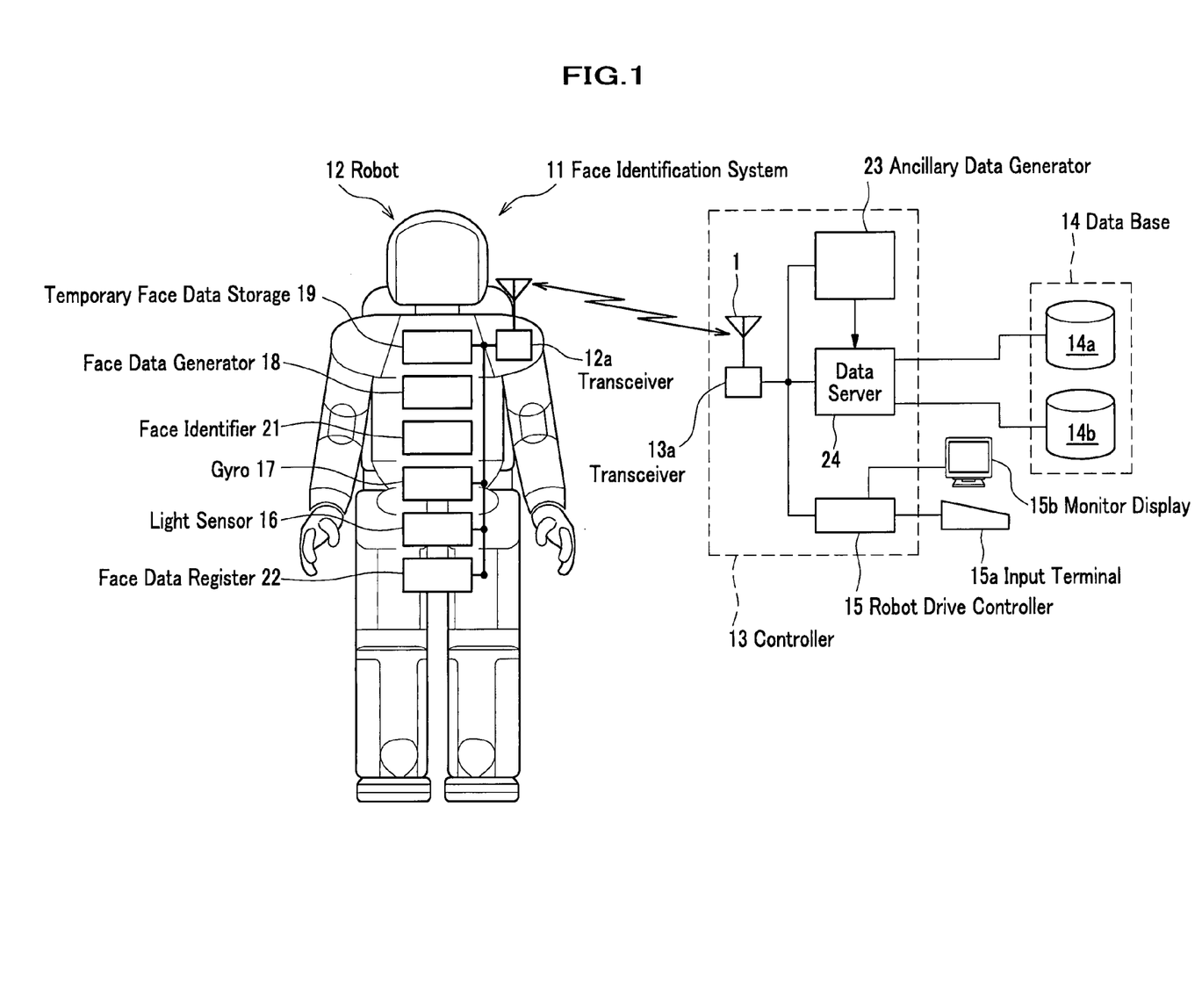
FIG. 1 is a block diagram that shows the face identification system of the present invention.
Figure 2:
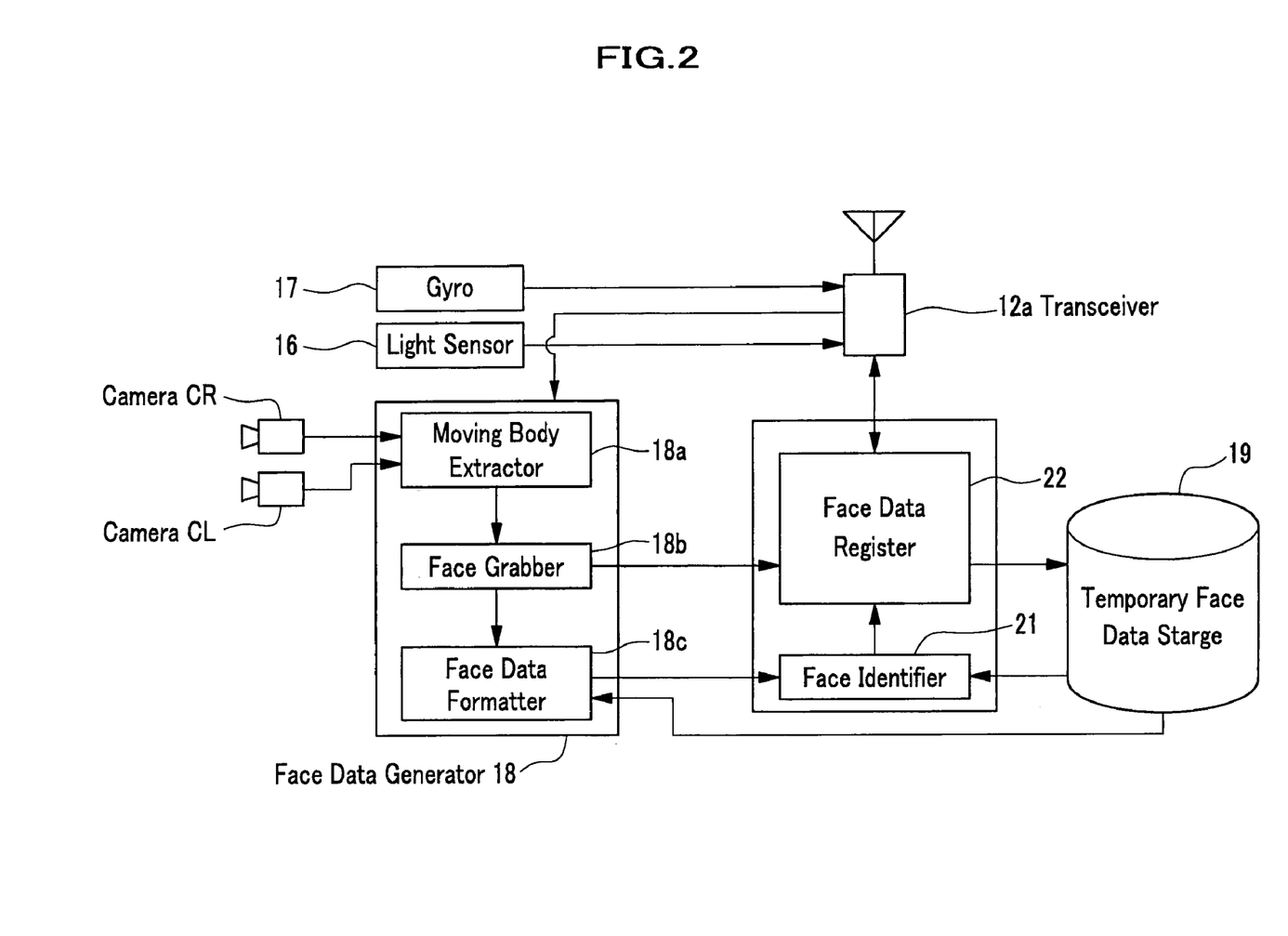
FIG. 2 is a block diagram that shows the relation among the temporary face data storage, the face data generator 18, the face identifier and the face data register.

As shown in FIGS. 1 and 2, the robot 12 has a pair of cameras CR and CL to take the still images of an objective person to be specified and identified (we call "an objective person" hereinafter, a face data generator 18 that generates, as will be explained later, a specific face data from the still image of the objective person, temporary face data storage 19 that temporarily stores the face data sent by a controller 13, a face identifier 21 that identifies the objective person by comparing with the face data stored in the temporary face storage 19, a face register 22 that holds a new face data to be stored in a data base 14, a gyro 17 that specifies the present position of the robot 12, a light sensor 16 that detects the brightness of the place where the robot 12 stays and a transceiver 12a that supports the communication with a controller 13.

The cameras CR and CL are color CCD cameras that take the still images of the objective person. Each framed image of the acquired still images is stored in a frame grabber (not shown in the figures) and input to a moving body extractor 18a included in face data generator 18.

As shown in FIG. 2, the face data generator 18 comprises a moving body extractor 18a, a face grabber 18b and a face data formatter 18c. These elements are properly interfaced to work in this sequence. The face data generator 18 is linked with a transceiver 12a which receives the environmental correction parameters (more concretely skin tone parameters to be used in the face grabber 18b) for the face identification through an environmental data handler 34 and the controller 13. The skin tone parameters may preferably be used for adjusting the gain or the white color balance of the cameras CR and CL.

The moving body extractor 18a can detect and extract the moving images from the images of the objective persons taken by the cameras CR and CL. By using the parallax of the left and right images, the distance information is calculated and combined with the each picture element that composes the images (called distance information embedded images). A reference image is taken by one of two cameras CR and CL and the picture which differs from the reference image in the different time is specified. The differentiated image is created by the image region which corresponds to movement of the objective person. According to the distance information embedded images and the differentiated picture, the parallax which corresponds to the largest movement is specified and the distance that corresponds to the parallax is set as the distance where the objective person locates from the robot 12 (called objective distance). The picture elements which are included in the range of the predetermined distance from the objective distance are extracted to generate an objective distance image. The region image that the picture elements in the objective distance compose of is analyzed with SNAKES method and the contour of the image is computed. Then the moving body is specified with the contour.

The SNAKES method is to determine the contour of the object by shrinking to deform the shape of contour under the minimum energy function condition for the dynamic contour model applied for the region in a closed loop.

The face grabber 18b specifies the face image region which is determined by the conditions such that those covered by the skin tone parameter obtained by the image that is taken by the camera CR and CL and those included in the region corresponding to the head of the objective person that is extracted by the moving body extractor 18a. When the face grabber 18b cannot specify the face image region due to the lack of sufficient skin tone parameters, the robot 12 concludes that the objective person is missing. The face grabber 18b has a normalization function that is to change the scale, the rotation and the position of the face in a way that the particular remark of the face is matched with the standard face remarks. The face image obtained by the face grabber 18b is called face image data after such normalization. The face image is handed over to the face data formatter 18c and the face data register 22. In the normalization of the face image data, the skin tone parameters sent by the controller 13 are set to the face region specified by the face grabber 18b.

The face image data obtained by the face grabber 18b are composed into a face vector in the face data formatter 18c. And the scalar products are computed between the face vector and the specific face vector that is an eigen vector for each independent face remark. The face image data is presented by the scalar products so that the face image is expanded in an independent face remarks space (mathematically face image vector of the objective person defined on the independent face remarks). The each scalar product is then the coefficient against the independent face remarks and the vector given by the coefficients (called "feature vector" in a specific nomenclature or "feature data" in the general nomenclature hereinafter) specifies the face of the objective person in a vector space of face remarks.

The face identifier 21 is linked with face data formatter 18c and the temporary face data storage 19. The face identifier 21 compares the face data generated by the face data generator 18 with the face data of a specific person already recorded and obtains "resemblance" of the objective person with the person whose face data are stored in the temporary face data storage 19 with specific ID.

Figure 6:
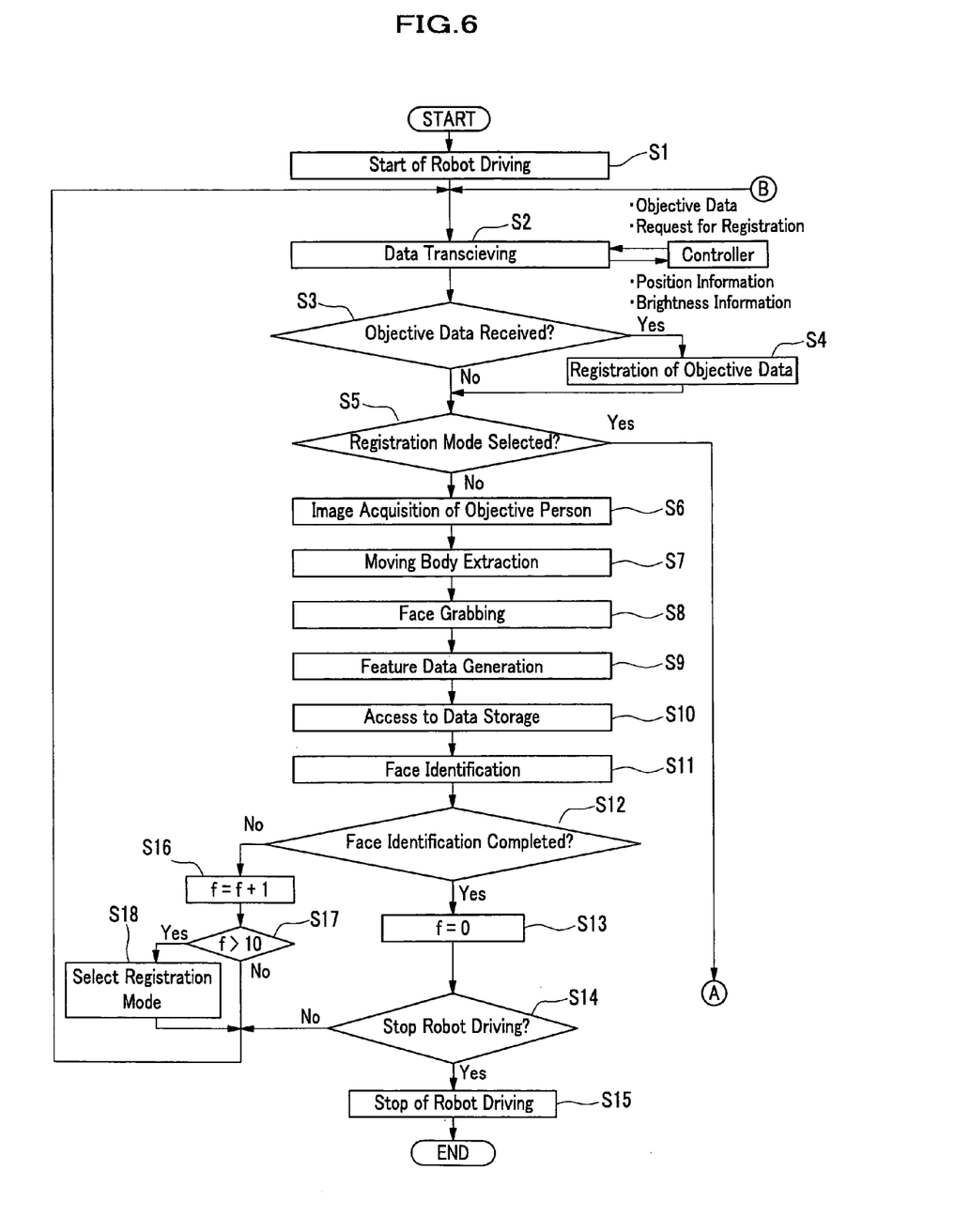
FIG. 6 shows a flow chart that shows a flow of a series of the action of the robot under the operation.

The face identifier 21 has a counter function to count the identification trial times (as shown in FIG. 6). Since this counter counts up the trial times, the most resemble person stored in the temporary face data storage is not determined against the objective person, the face image data (an output from the face grabber 18b) of this objective person is stored in the face image data base 14b (FIG. 1), to which the engine vectors for the independent face remarks are stored beforehand as well. The face identifier 21 sends the request to the face data register 22 for such storage.

The temporary face data storage 19 is linked with the face data formatter 18c, the face identifier 21 and the face data register 22. The temporary face data storage 19 is to store the face data of the specific person, the person's ID number, the feature vector provided by the face data generator 18 and the eigen vector. The feature vector corresponds to "reference face data" hereinafter.

The face data register 22 is linked with the face grabber 18b, the temporary face data storage 19 and the transceiver 12a. The face data register 22 can register the still image of the objective person in framed images sent from face grabber.

Figure 7:
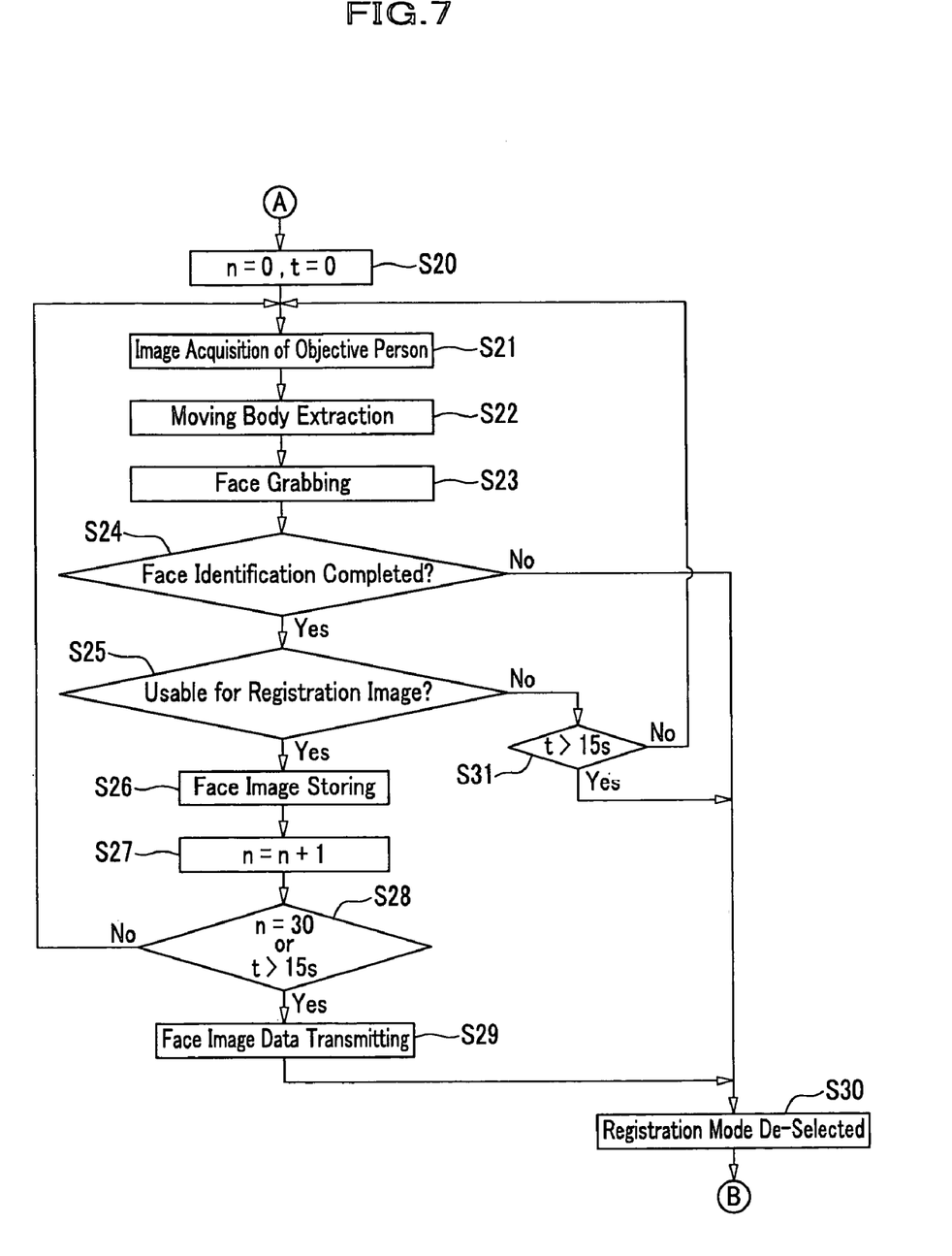
FIG. 7 shows a flow chart that shows a flow of a series of the action of the robot in the case when the registration mode is selected.

The face data register 22 has a function to temporarily memorize the face image data for face identification process and has a counter function to count the accumulation of memorized face image data in frame wise as "n" pieces (see FIG. 7).

The face data register 22 handles the feature data sent from the controller 13 through the transceiver 12a and records them into the temporary face data storage 19. Receiving the request sent from the face identifier 21, the face data register sends the face image data which is obtained from the face grabber 18b to the transceiver 12a and the face image data is finally sent to the controller 13. The operation such that the face data register sends the face image data to the transceiver 12a is presented as "the registration mode is selected". The request is not raised only by the face data register 22 but by the robot drive controller 15 (see FIG. 1). Therefore, the registration mode is selected by the request for face data registration raised by the robot drive controller 15.

The face data register 22 has a clock function so that the registration mode is deselected if no face image data are sent to the controller within the predetermined time after the registration mode was selected.

The gyro 17 determines the trajectory of the traveling of the robot 12 in his moving area with an integrator. Therefore the information of each instantaneous position is obtained. The light sensor 16 detects and measures the brightness of the illumination or the brightness of the surrounding space and provides the information of such brightness.

The output information from the gyro 17, the light sensor 17 and the face data registration is input to the transceiver 12a which serves for and arbitrates the communication between the robot 12 and the controller 13 (see FIG. 1).

The controller 13 comprises an ancillary data generator 23, a data server 24, a robot driving controller 15 and a transceiver 13a (see FIG. 1). The transceiver 13a is constructed in the same design as the transceiver 12a (see FIG. 1) built in the robot 12. The details of an ancillary data generator 23, the data server 24 and a robot driving controller 15 will be explained as below.

Figure 3:
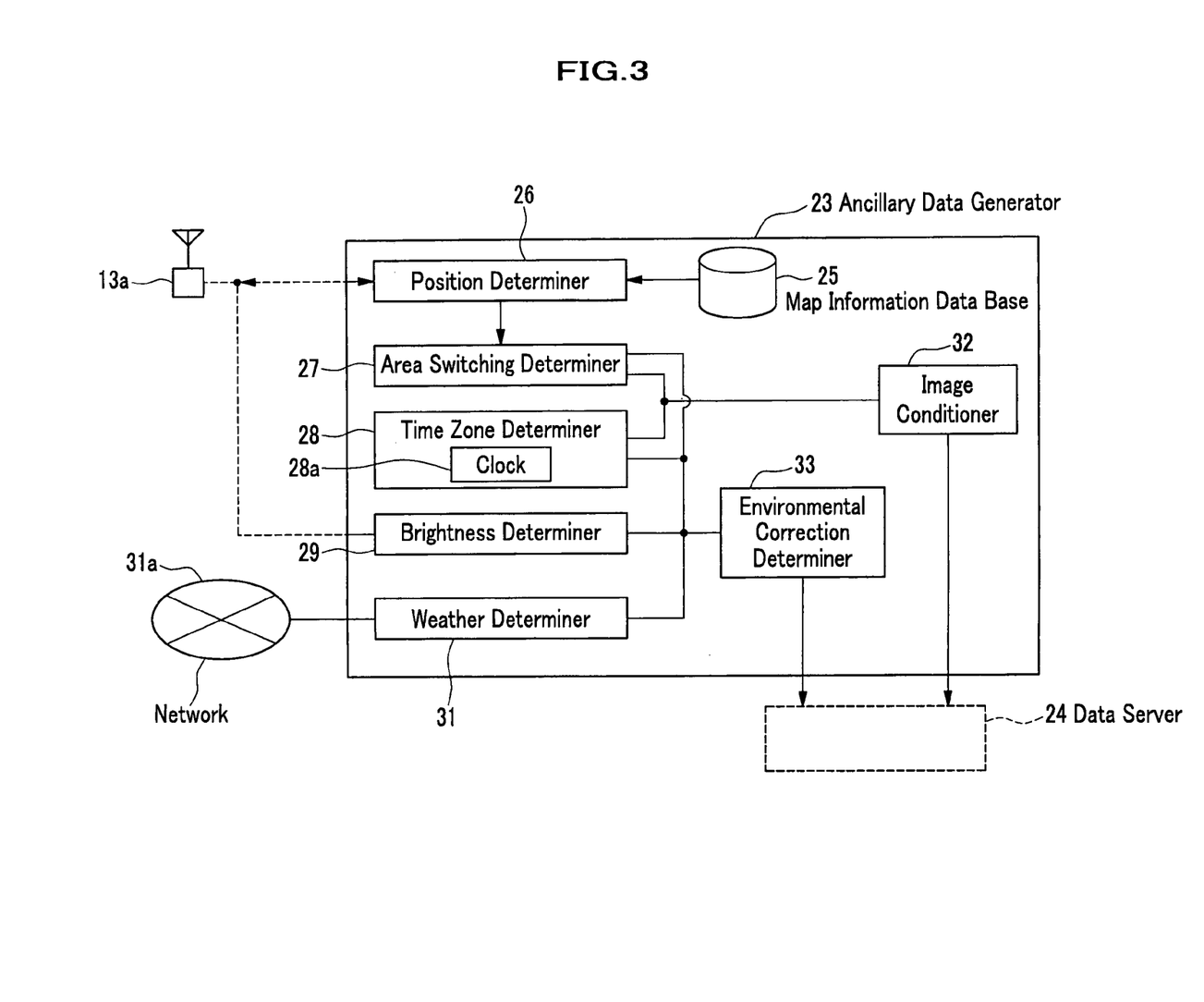
FIG. 3 is a block diagram that shows the details of the ancillary data generator.

As shown in FIG. 3, the ancillary data generator 23 comprises a transceiver 13a, a position determiner 26, an area switching determiner 27, a time zone determiner 28, a brightness determiner 29 and a weather determiner 31, an image conditioner 32 and an environmental correction determiner 33.

The position determiner 26 receives the position information output from the gyro 17 built in the robot 12 through the transceiver 13a. The position determiner 26 specifies the position of the robot 12 in the area among the plural areas in which the robot 12 possibly moves by comparing the position information with the map information retrieved from the map information data base 25.

The area switching determiner 27 determines the change of the area where the robot 12 is present by referring to the position of the robot 12 which has been specified by the position determiner 26. The change of the area implies that the robot 12 crosses over the boarder between two adjacent areas. The examples of the change of the area are that the robot 12 enters into a parliament from a reception and the robot 12 moves into ward 2 from ward 1 of the buildings included in the yard of the company.

The time zone determiner 28 determines the presence of the robot 12 at a certain area in a new time zone which has been sent beforehand from a previous time zone by using a clock 28a built in the time zone determiner 28. However, it is not necessary that the lengths of the time zones are same. The examples of the time zones are the time zone of a working time of a specific employee, meeting schedules of visitors and time zone specified in the sequence of the light-on and the light-off of the company building.

The brightness determiner 29 receives the information of the light sensor 16 (see FIG. 1) built in the robot 12 through the transceiver 12a and 13a and determines the brightness of the illumination lighting the area where the robot 12 stays.

The weather determiner 31 receives the on-line weather report through a network 31a such as Internet and determines the weather of the area where the robot 12 stays.

Figure 4:
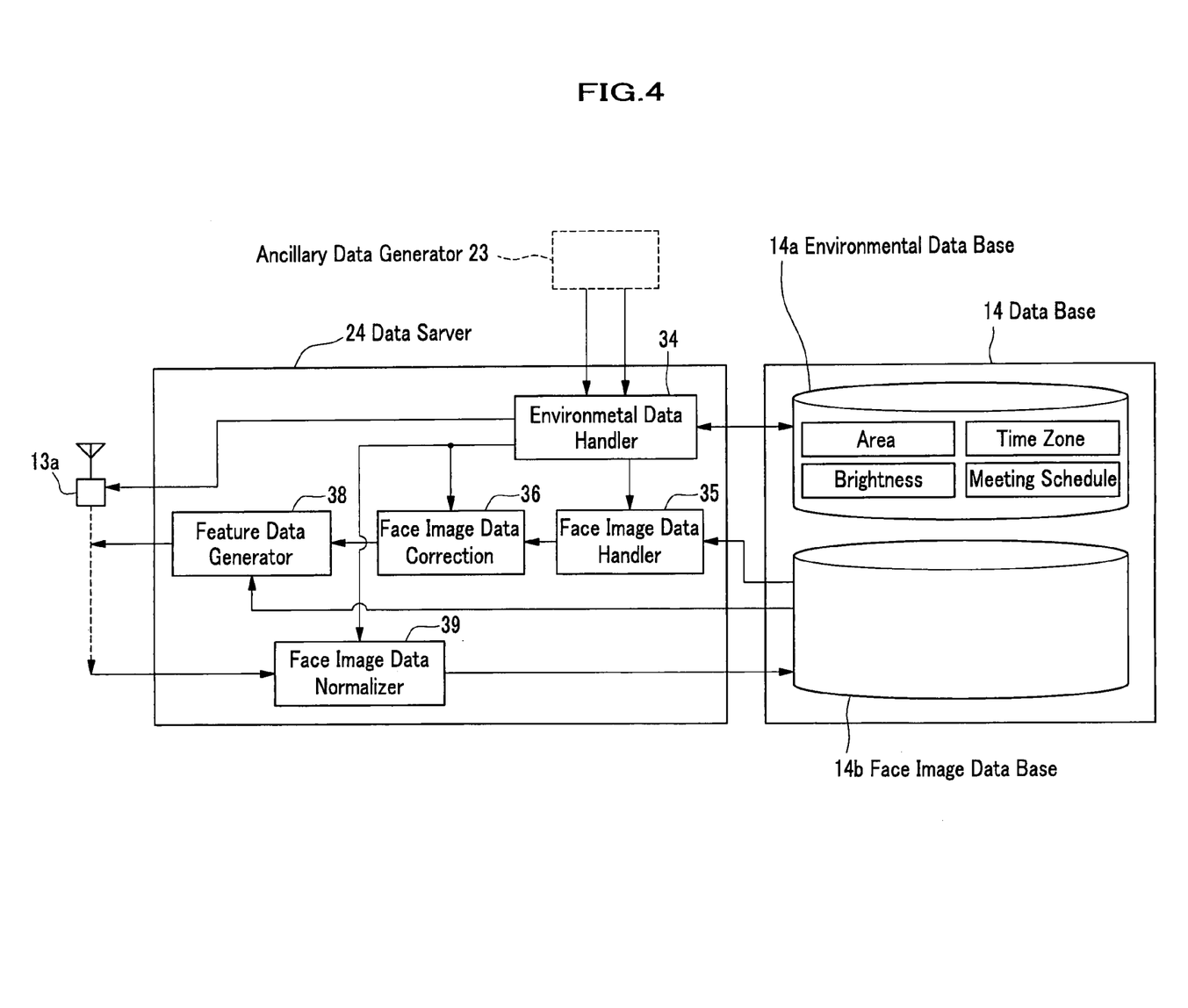
FIG. 4 is a block diagram that shows the details of the data base and the data server.

The image conditioner 32 sets the environmental correction with which the face image is reproduced when the face image data stored in the face image data base 14b (see FIG. 4) are retrieved by the data server 24 (see FIG. 4).

The image conditioner 32 receives the information from the area switching determiner 27 so that the image conditioner 32 has the information of the area where the robot 12 stays for every switching time. The image conditioner 32 receives the information from the time zone determiner 28 so that the image conditioner 32 has the information of the time zone when the robot 12 stays for every passing of the time zones. The image conditioner 32 does not provide the image conditional information such as the areas and time zones if no changes of the areas or the time zones are made.

The environmental correction determiner 33 modifies and determines the correction values specific to the time when the environmental correction values are retrieved from the face identification condition data base 14a. The environmental correction determiner 33 receives the information from the area switching determiner 27 so that the environmental correction determiner 33 has the information of the area where the robot 12 stays. The environmental correction determiner 33 receives the information from the time zone determiner 28 so that the environmental correction determiner 33 has the information of the time zone when the robot 12 stays for every passing of the time zones.

The environmental correction determiner 33 receives the information from the brightness determiner 29 so that the environmental correction determiner 33 has the information of the brightness of the illumination lighting the area where the robot 12 stays. We call the brightness (which the light sensor 16 detects) as the measured brightness, hereinafter. The environmental correction determiner 33 receives the information from the weather determiner 31 so that the environmental correction determiner 33 receives the on-line weather information of the area where the robot 12 stays. The environmental correction determiner 33 provides the conditional information for the correction value in response to changing of the area, the time zone, the measured brightness and the on-line weather information.

The environmental correction determiner 33 uses the above change of the area, the time zone, the measured brightness and the on-line weather information as a trigger to accelerate the environmental data handler 34 to retrieve the environmental data from the environmental data base 14a. The environmental correction determiner 33 does not provide the conditional information such as the areas, the time zones, the measured brightness and the on-line weather information if no changes of the conditional information are made.

As shown in FIG. 4, the data server composing the controller 13 comprises an environmental data handler 34, a face image data handler 35, a face image data correction 36, a feature data generator 38 and a face image data normalizer 39.

The environmental data handler 34 receives the image conditional information and the environmental conditional information from the ancillary data generator 23 and retrieves the environmental data from the environmental data base 14a. Then the environmental data handler 34 provides the environmental data corresponding to the image conditional information and the environmental conditional information.

The environmental data corresponding to the image conditional information includes the ID of the persons who should be presented in the area and the time zone responding to the presence of the robot 12.

The environmental data corresponding to the environmental conditional information includes the correction values of the average illumination brightness at the area where the robot 12 stays for the specific time zone, the average brightness detected by the light sensor 16, the brightness detected by the light sensor 16 built in the robot 12, the brightness estimated by the on-line weather information condition and the skin tone parameters used in the face grabber 18b.

In the environmental data corresponding to the environmental conditional information given by the environmental data handler 34, the correction values of average illumination brightness at the area where the robot 12 stays for the specific time zone and the brightness estimated by the on-line weather information to be provided for redundancy as well as the correction value of the measured brightness.

The redundancy implies that such correction values will be alternatively used if, for example, the light sensor 16 does not work due to an unexpected trouble. For this purpose, the above correction values for redundancy are obtained in a pair with the correction value of the measured brightness. It is possible to use the correction values in reverse wise such that the former correction values are used for the actual correction and the latter for the redundancy.

The face image data handler 35 retrieves the specific face image data on the basis of the ID, being included in the image conditional information which the environmental data handler 34 provides, from the face image data base 14b. Then the face image data handler 35 hands the face image data over to the face image data correction 36.

The face image data correction 36 receives the conditional information from the environmental data handler 34 so that the face image data handed over by the face image data handler 35 is corrected with the environmental data corresponding to such conditional information.

The face image data correction 36 hands the image data over to the feature data generator 38 after an environmental correction.

The feature data generator 38 has the same function as the face data formatter 18c in the face data generator 18. The feature data generator 38 generates the feature data from the face image data corrected by the face image data correction 36 using the eigen vector stored in the face image data base 14b. Then the feature data are provided by the scalar products of the feature vector and eigen vectors representing independent face remarks. The feature data and the eigen vectors retrieved from the face image data base 14b are transmitted to the robot 12 through the transceiver 13a. The level of the environmental correction performed on the feature data is same as that of the in-situ image data of the objective person taken by the cameras CR and CL at the area where the robot 12 stays since the image data has been corrected at the face image data correction 36.

The face image data normalizer 39 receives the face image data memorized in the face data register 22 (see FIG. 2) built in the robot 12 through the transceiver 13a and the environmental data sent by the environmental data handler 34, as well as adds ID of the objective person when his face image data is stored in the face data base 14b. The face image data normalizer 39 normalizes the face image data to be newly registered and stored after a reverse correction which is a correction reversely done at the face image data correction 36 using the conditional information provided by the environmental data handler 34. The face image data normalizer 39 adds the information of the area and the time for which the image data were acquired in a linkage with the ID of the objective person when his face image data is stored in the face image data base.

The "normalization" implies that the actual face image data is corrected to be those taken under a reference brightness of the illumination.

The robot drive controller 15 is connected with an input terminal 15a and a monitor display 15b as well as with the transceiver 13a. This robot controller 15 is used by an operator in case when he operates the robot 12. According to the command of the operator, the robot controller 15 can send a request to the face data register 22 for selecting the registration mode.

The input terminal 15a is to input the commands to the robot 12 and the monitor is to confirm the command.

The data base 14 consists of the environmental data base 14a and the face image data base 14b. In the face image data base 14b, the normalized face image data associated with the IDs of the objective persons are stored. The face image data base 14b includes the feature vectors which are used for the face data of the objective person expanded in the face remark space.

Figure 5A:
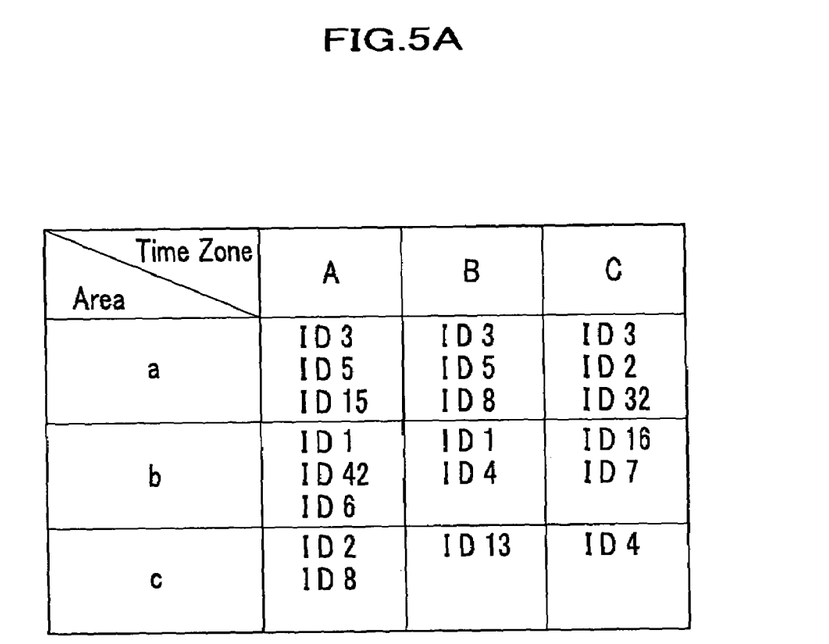
FIG. 5A shows an environmental data table that corresponds to the image conditional information stored in the environmental data base.

The environmental data base 14a includes the ID of the objective persons in accordance with the areas and the time zones. Such information is equivalent to the environmental data corresponding to the image conditional information. As examples for the image conditional information, there are the information of the presence of a specific objective person for the areas a, b and c and the time zones A, B and C, the information of the places in the company building, the working times of the employees and the information of the time zones scheduled for meetings or interviews.

Figure 5B:
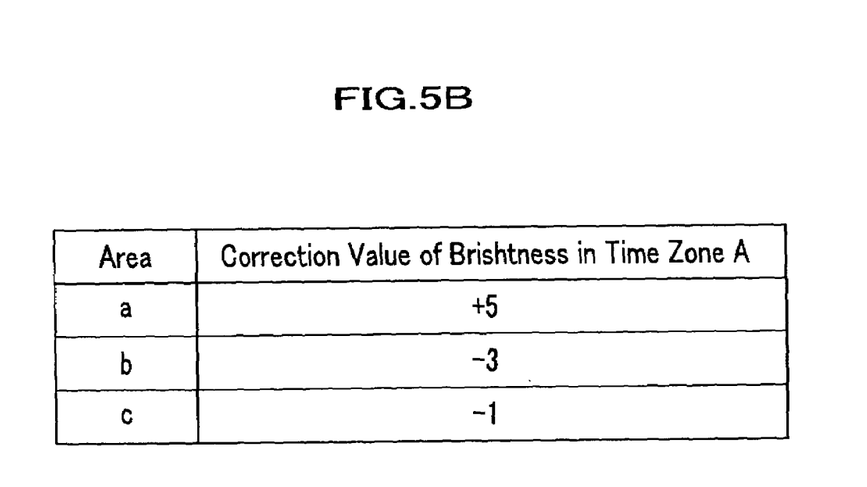
FIG. 5B shows another environmental data table that corresponds to the conditional information which is stored in the environmental data base.

The environmental data-stored in the environmental database 14a are, as shown in FIG. 5B, linked with the corrections of the skin tones specified by the brightness of the areas a, b, c in time zone A, those specified by the electric illumination or those by day light through the window.

We will explain the operation of the present face identification system.

The action of the robot 12 to obtain the face image of the object person is shown in FIG. 6 from the start to drive the robot 12 (step S1) until the stop to cease the robot action (step S15) during which an iteration of data transceiving, recording the feature data and else to the temporary face data storage 19 (see FIG. 2), image acquisition of the objective person, specifying and identifying the face of the objective person whose photo is taken, transmitting the new face image data to the controller 13 (see FIG. 1).

A sequential action of the robot 12 is explained by FIG. 1 and FIG. 2. The robot 12 transmits the position information specified by the gyro 17, the brightness information determined by the light sensor detection to the controller 13 and receives the request for registering the feature data and face image data (step S2). The transmitting and the receiving are carried out by the transceivers 12a and 13a. The face data which the robot 12 receives are screened against the objective persons who are present on the basis of the environmental data. The screening works as a selection of the possible objective persons by virtue of the concurrent presence in an area and time zone with said robot 12.

When the robot 12 receives the face data, the ID and the eigen vector (called "objective data" in FIG. 6) as shown in the branch of "yes" in the step S3, the temporary face data storage 19 memorizes the face data, the ID and the eigen vector. When the robot 12 does not receive the face data, the ID and the eigen vector as shown in the branch of "no" in the step S3, the operation shifts through the step S5 to the step S6, where the cameras CR and CL built in the robot 12 (see FIG. 2) take the images of the objective person. The moving body extractor 18a (see FIG. 2) extracts the moving body (the objective person) from the images taken by the cameras (step S7).

The extraction of the moving body is carried out as previously explained by using SNAKES.

The face grabber 18b (see FIG. 2) specifies the face image region by using the image region of the objective person extracted by the moving body extractor 18a during the time for taking the image as a moving body (step S8). The detection of the face image is carried out by extracting the region of the skin tone parameter obtained by the image taken by the camera CR and CL and specifying the region of the same skin tone parameter that corresponds to the head of the objective person extracted by the moving body extractor 18a. The face grabber 18b performs a normalization process for the face image and the normalized data of the face image is shifted to a step of the face data formatter 18c (see FIG. 2).

The face data formatter 18c generates the feature data by referring the eigen vectors stored in the temporary face data storage 19 and computing the scalar products between the face vector generated by the face image data and each eigen vector for each independent face remark (step S9).

The generated feature data is sent to the face identifier 21 (see FIG. 2) which access the temporary face data storage 19 (step S10). The face identifier 21 identifies the face of the objective person whose face images have been taken by the camera CR and CL by comparing the feature data retrieved from the temporary face data storage 19 and the feature data generated by the face data formatter 18c (step S11).

If the face identifier 21 finds the feature data corresponding to the those generated in the face data formatter 18c in the retrieved data from the temporary face data storage 19 (that is shown in the branch "Yes" of the step S12), an additional subroutine (not shown in the figures) corresponding to the specific ID such as particular greeting or guidance is carried out. If the subroutine is ended, the "f" value in the counter step S16 is initialized to be zero (step S13) and the process returns to the step S2 when no stop to drive the robot 12 is made (the branch "No" in the step S14). If the robot 12 is stopped to be driven (the branch "Yes" in the step 14), a series of driving the robot 12 is ended by stopping to drive the robot 12 (step S15).

If the face identifier 21 cannot identify the face (the branch "No" in the step S12), a counter routine cooperating with the identification step performs the counter steps S16 and S17. The steps from S2 to S17 are repeated for "f" is equal to or less than 10 (the "No" branch in the step S17). If "f" is greater than 10 (the branch "Yes" in the step S17), the registration mode of this face identification system 11 is selected (step S18).

The reason why the counter step as a combination of S16 and S17 is added is to support the case when the image of the objective person is not appropriately obtained in the image acquisition (step S6) in addition to the case when the feature data is not memorized in the temporary face data storage 19. By this additional step, it is possible to confirm the image acquisition of an appropriate objective person. In the present embodiment, the count up figure shown as f<10 in the step S17 is not limited by "10" but may arbitrarily be selected.

The details of the step S5 are explained. The transceiver 12a built in the robot 12 receives the request for registering the face image data sent from the robot driving controller 15 (see FIG. 1) which is built in the controller 13. When the face data register 22 receives this registration request and the registration mode of this face identification system 11 is selected (the branch "Yes" in the step S5), or when the registration mode is selected in the step S18. Therefore "n" in the counter step (step S27 and S28) and "t" in the timer (clock function) of the face data register 22 are initialized (t=0 at step S20) as shown in FIG. 7. The timer starts upon when it is initialized (step S20). The image acquisition of the objective person (step S21), Extraction of the moving body (step 22) and the detection of the face (step S23) are performed in a sequence to the step S21.

After the step S23 where the face grabber 18b receives the data sent from the moving body extractor 18a, the face grabber 18b makes a judgment whether the objective person is missing or has been detected by detecting the skin tone region within the contour of the moving body (step S24). When the face grabber 18b makes a judgment that the objective person has been detected (the branch "Yes" in S24), the face grabber 18b extracts the face remarks and obtains a normalized face image data by changing the scale and rotation of the face position to be matched with the standard face remarks. The possibility to use it as a registration purpose is evaluated by the completion of extracting the face remarks (step S25).

If the face grabber 18b determines the face image data can be used for a registration image (the branch "Yes" in the step S25), the face register 22 receives the registration image from the face grabber 18b and stores in the memory (step S26). By using the counter function of the face data register 22, the face data register 22 sends all of the face image data stored in the memory in the data register to the controller 13 through the transceiver 12a (step S29) when the number "n" of the accumulation of the registration image becomes 30 pieces or the timer of the face data register 22 passes longer than 15 seconds (t>15s) (the branch "Yes" in the step S28). When the face data register 22 deselects the registration mode (step S30), the operation of the robot 12 goes back to the step S2.

When the face grabber 18b cannot detect the face of the objective person (the branch "No" in the step S24), the face data register 22 deselects the registration mode and the operation of the robot 12 returns to the step S2.

If the face grabber 18b fails to extract the face remarks so that the face image data is determined not to be used for the registration image (branch "No" in the step S25), the operation of the robot 12 returns to the step S2 after the face data register 22 deselects the registration mode (step S30) at the time exceeding 15 seconds (branch "Yes" in the step S31) after the initialization of the clock (step S20).

When the stop operation of the robot 12 is selected (the branch "Yes" in the step S14), the sequential operation of the robot 12 is terminated by issuing a stop command (step S15).

Figure 8:
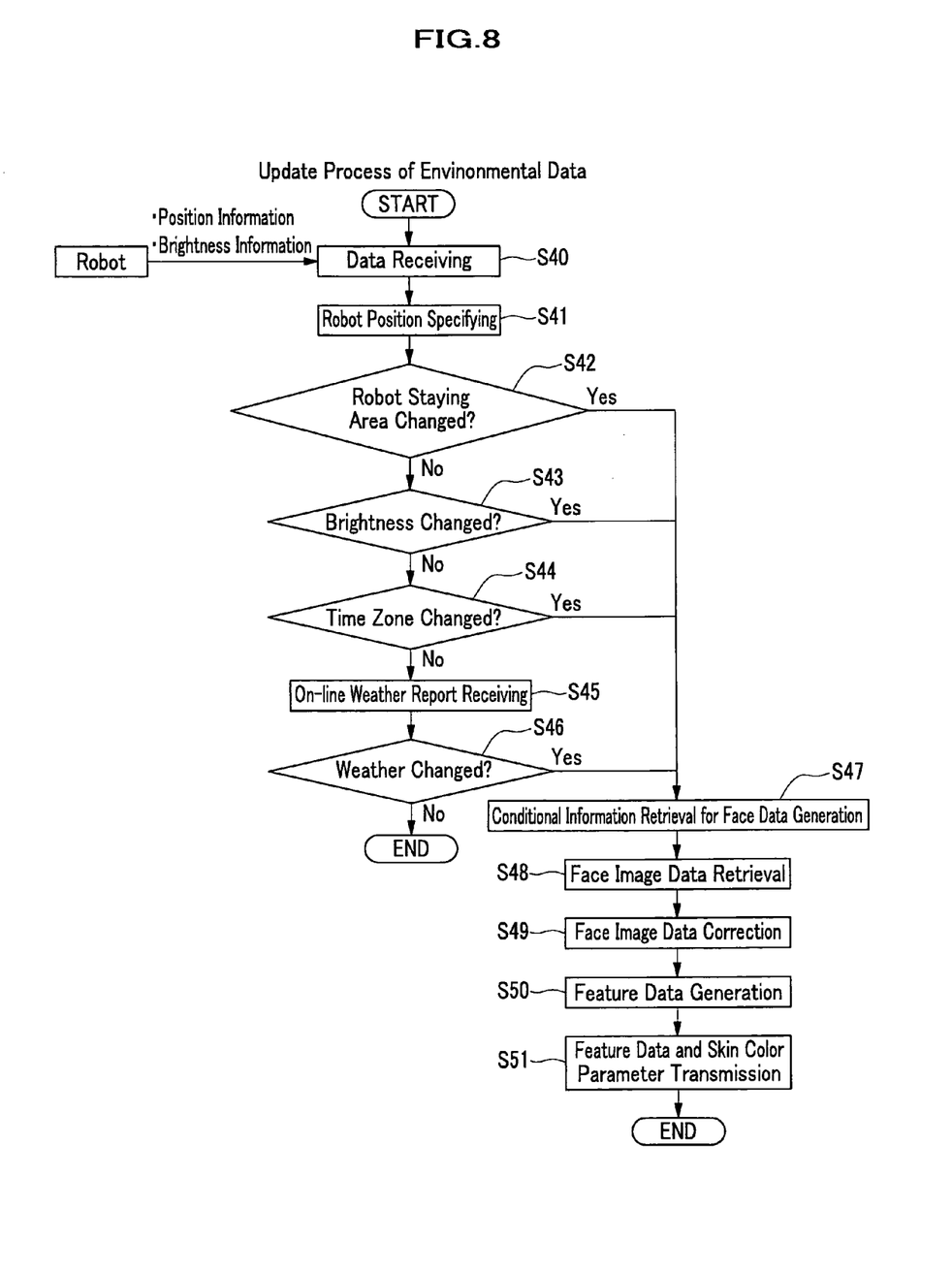
FIG. 8 shows a flow chart that shows the data updating process of the controller for the data recorded in the temporary face data storage.

When the transceiver 13a receives the position information of the robot 12 and the brightness information (step S40), the position determiner 26 (see FIG. 3) in the controller 13 specifies the position of the robot 12 in the area (step S41) by comparing the position information and the map information retrieved from the map information data base 25.

The area switching determiner 27 determines the changing of the area where the robot 12 stays referring the position of the robot 12 determined by a position determiner 26 (step S27). The brightness determiner 29 determines the changing of brightness of the illumination lighting the area where the robot 12 stays based on the information of the brightness detected by the light sensor 16 (see FIG. 1) (step S43). The time zone determiner 28 determines the change of the time zones which have been set beforehand (step S44). The weather determiner 31 determines the change of weather (step S46) by receiving the on-line weather report (step S45). As the result of processing all these steps, no changes have been determined as the branch "No" in the step S42, the branch "No" in the step S43, the branch "No" in the step S44 and the branch "No" in the step S46 are selected, the image conditioner 32 and the environmental correction determiner 33 (see FIG. 3) sends neither the image conditional information nor the environmental correction. Therefore, no updating of the face image data stored in the temporary face data storage 19 is made and the operation process of the controller 13 is terminated.

On the other hand, if any of the change is determined as the branch "Yes" in the step S42, the branch "Yes" in the step S43, the branch "Yes" in the step S44, the branch "Yes" in the step S46, the image conditioner 32 and the environmental correction determiner 33 provide both the image conditional information and the environmental correction or at least the environmental correction. If the environmental data handler 34 receives any of the image conditional information or the environmental correction, the conditional information is retrieved from environmental data base 14a (step S47). We assume that both the image conditional information and the environmental correction are sent from the image conditioner 32 and the environmental correction determiner 33.

If the environmental data handler 34 receives the specific information of image conditional information (the area=a and the time zone=A) and the environmental correction (the area=a and the brightness=X), the environmental data handler 34 refers to the table (shown in FIG. 5A) retrieved from the environmental data base 14a. The environmental data handler 34 obtains the IDs given as ID3, ID5 and ID15 as the environmental data corresponding to the image conditional information on the basis of the image conditional information (the area=a and the time zone=A). The persons specified by these IDs are the possible persons who are present in the area a at the time zone A. Next, the environmental data handler 34 refers to the table (shown in FIG. 5B) retrieved from the environmental data base 14a. The environmental data handler 34 receives the correction value (+5) of the illumination as the environmental data for the specific information of environmental correction (the area =a and the brightness =X).

The environmental data handler 34 retrieves the skin tone parameter from the environmental data base 14a and sends the skin tone parameter to the face data generator 18 in the controller 13. The skin tone parameter is to be used for the normalization process of the acquired face image at the face grabber 18b. Therefore, it is possible to determine the face of the objective person in response to the brightness of the illumination lighting the area where the robot 12 stays.

The face image data handler 35 retrieves the face image data linked to ID3, ID5 and ID15 from the face image data base 14b, when the environmental correction corresponding to the image conditional information is sent to the face image data handler 35.

On the other hand, the face image data correction 36 (see FIG. 4) obtains the correction value (+5) of the illumination from the environmental data handler 34 and the face image data linked with ID3, ID5 and ID15 from the face image data handler 35. The face image data correction 36 corrects the face image data with the correction value (+5) (step S49). The image data corrected in this correction process has the same level of the correction as the image that the robot 12 acquires by the camera CR and CL at the particular are and time.

When the corrected face image data is sent to the feature data generator 38 (see FIG. 4) from the face image data correction 36, the feature data generator 38 retrieves the eigen vector from the face image data base 14b and the feature data (step S50) in the same way as in the step S9. The process to transmitting the feature data to the controller 13 of the robot 12 is ended after the feature data and the eigen vector are sent to the robot 12 through the transceiver 13a (step S51 (see step S6 in FIG. 6)).

Figure 9:
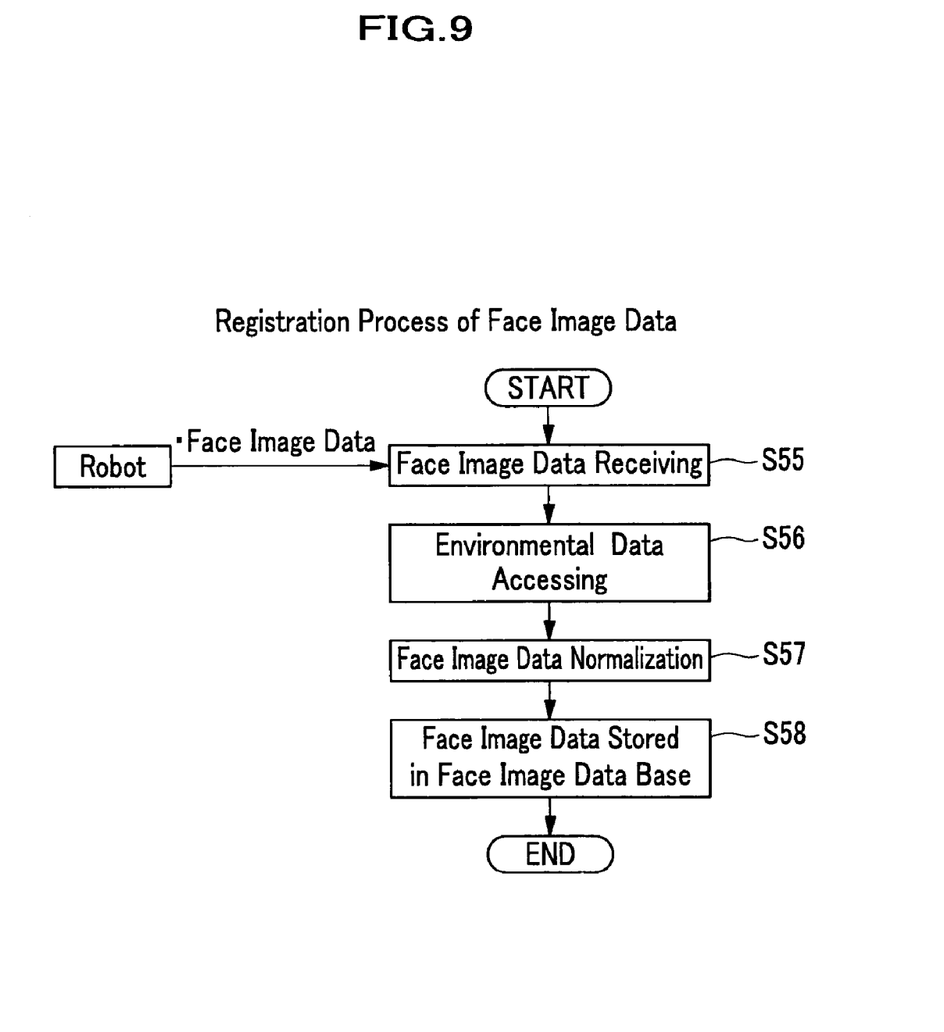
FIG. 9 shows a flow chart that shows the registration process of the face image data sent by the robot.

The registration process of the face image data sent from the robot 12 at the controller is explained. As shown in FIG. 9, when the face data register 22 of the robot 12 sends the face image data (see step S29 in FIG. 7) through the transceiver 12a, the transceiver 13a receives these face image data and sends them to the face image data normalizer 39 (see FIG. 4). The face image data normalizer 39 normalizes the face image data (step S57) by referring the environmental data obtained from the environmental data handler 34 (see S56). In these steps, the face image data normalizer 39 normalizes the face image data to be newly registered by carrying out a reverse operation done in at face image data correction 36. Then the face image data normalizer 39 add the ID of the objective person to the normalized face image data and stores the face image data in the data base 14 (step S58). Then the registration process of the face image data by the controller 13 is ended.

In the above embodiment, the present invention of the face identification system 11 can provide the following advantages. Since the robot 12 specifies the objective person after screening the person in accordance with the information of the area and the time zone regarding the presence of the objective person. Therefore the persons who are probably not presented in such area in such a certain time are screened out and not recorded in the temporary face data storage 19. According to this screening method of the present face identification system 11, the robot 12 enables to improve identification conclusion and shorten the process speed for the identification due to the data volume to be processed for the identification can be reduced.

In the present face identification system 11, the robot 12 specifies the position in the area where the robot 12 stays by using the gyro 17 and determines the switching of areas where the robot 12 passes by. Therefore the robot 12 can self-determine the possible objective persons who stay in the area and send the request their feature data to the controller 13.

In the present face identification system 11, the robot 12 specifies the change of the position and the change of time zone of and in the area where the robot 12 passes by and the possible objective persons are retrieved by such update information of the presence of the robot 12. Therefore the robot 12 enables to improve the success of the identification and shorten the process speed for the identification due to such update information.

In the present face identification system 11, the robot 12 generates the feature data by correcting the face image data retrieved from the face image data base 14b on the basis of the brightness of the illumination lighting the area where objective person and robot 12 stay. Therefore the feature data has an equivalency in the environmental correction to the feature data that is generated from the face image data acquired in such brightness of illumination lighting the area. For this equivalency in the environmental correction, the identification rate can be improved.

In the present face identification system 11, the robot 12 collects the information of the brightness of the area around the robot 12 by using the light sensor 16. The feature data is generated by using this information of the brightness. Therefore the face identification rate by this robot 12 can be further improved by the present face identification system 11.

In the present face identification system 11, the robot 12 determines the information of brightness of the area where the robot 12 stays by the information of the area, time zone and the weather condition where the robot 12 stays at the present time.

In the present face identification system 11, the weather determiner 31 is linked with a network 31a and determines the brightness of the area in accordance with the seasons.

In the present face identification system 11, the robot 12 can specifies the schedule of the person by using the information of the change of the time zone and the change of the area which the robot 12 passes by. Therefore, the robot is 12 of the present invention has an advantage to work as a receptionist to guide the guests by specifying and identifying the objective person and the using the updated information of the schedule of the person.

Although there have been disclosed what are the patent embodiment of the invention, it will be understood by person skilled in the art that variations and modifications may be made thereto without departing from the scope of the invention, which is further explained in the following paragraphs.

The updating of the new feature data in the temporary face data storage 19 and the registration of the new face image data into the face image data base 14b are automatically carried out in the system, however we may manually complete such operations.

In the present face identification system 11, the ancillary data generator 23 automatically sends the image conditional information and the conditional information to the environmental data handler 34 of the data server 24. However, an operator who controls the robot 12 may input the information of the changes of the area and time zone which the robot 12 passes by after judging the present position and the time of his controlling robot. He may input such information into the environmental data handler 34 through GUI.

In the present face identification system 11, the robot 12 determines the registration of the face image data of the objective person by referring temporary face data storage 19. However, an operator who controls the robot 12 may judge whether the registration of the face image data of the objective person.

In the present face identification system 11, face data register 22 evaluates and determines whether the face image data of the objective person can be used for the face identification. However the operator can judge it by visually checking.

In the present face identification system 11, when the feature data generator 38 generates the feature data, the eigen vectors which have been stored in the face image data base are used. However, a group of face image data retrieved from the data image data base 14b regarding the objective persons to be referred by the robot 12 are analyzed in the subjective components and the data server 24 may equip with the eigen vector generator that computes the eigen vector. The eigen vector generator supplies the eigen vectors to the feature data generator 38.

The Internet is used in the present invention where LAN or WAM may be used for.

In the present face identification system 11, the face image data transmitted from the robot 12 is normalized and stored together with the ID, the information of the area and time in which the face image data are acquired. The historical data such as the times which the robot 12 has seen the objective person in the particular area may be stored in the data base 14. Such historical data can be used for the greeting action and responding action that the robot 12 takes and behaves.

What is claimed:

1. A face identification system comprising:
a robot, enabled to move to plural areas, that has a face data generator to generate face data of an objective person after acquiring a face image data of said objective person, a face data register to register said face data to be stored, a temporary face data storage to store said face data as reference face data and a face identifier to identify a face of said objective person by comparing said face data of said objective person and said reference face data,
a data base to record face data of plural persons and;
a controller which sends said face data as reference face data to said robot, wherein said face data are retrieved from said data base among face data of possible persons who have concurrent presence in an area and time zone with said robot.

2. A face identification system according to claim 1, wherein said robot has a sensor to detect a position of said robot and a transmitting device to send information of said position and, said controller has a position determiner to specify a position of said robot using said information of said position sent by said transmitting device.

3. A face identification system according to claim 1,
wherein said robot has a sensor to detect brightness of area where said robot stays and a transmitting device to send information of said brightness to said controller and,
said controller generates a reference face data by correcting said face data, being retrieved from said data base, with information of said brightness.

4. A face identification system according to claim 1,
wherein said robot has a sensor to detect a position of said robot and uses the transceiver to send information of said position and,
said controller has a position determiner to specify a position of said robot using said information of said position sent by said transceiver.

5. A face identification system comprising:
a robot, enabled to move to plural areas, that has a face data generator to generate face data of an objective person after acquiring a face image data of said objective person, a face data register to register said face data to be stored, a temporary face data storage to store said face data as reference face data and a face identifier to identify a face of said objective person by comparing said face data of said objective person and said reference face data,
a data base to record face data of plural persons and;
a controller which sends said face data as reference face data to said robot, wherein said face data are retrieved from said data base among face data of possible persons who have concurrent presence in an area and time zone with said robot,
wherein said controller specifies said possible persons, staying in a same area as an area where said robot is present, for every change of time zones which are predetermined on a basis of planned schedules of said objective persons.

6. A face identification system according to claim 5,
wherein said controller determines brightness of area where said robot stays and generates said reference face data by correcting said face data, being retrieved from said data base, with information of said brightness for every change of time zones which are predetermined on a basis of planned schedules of said objective persons.

7. A face identification system according to claim 6,
wherein, said data base has a record of skin tone parameters and said controller retrieves said skin tone parameters corresponding to brightness of an environment in which said robot stays from said data base and sends to said robot.

8. A face identification system comprising:
a robot, enabled to move to plural areas, that has a face data generator to generate face data of an objective person after acquiring a face image data of said objective person, a face data register to register said face data to be stored, a temporary face data storage to store said face data as reference face data and a face identifier to identify a face of said objective person by comparing said face data of said objective person and said reference face data, and a transceiver to enable communication outside the robot;
a data base to record face data of plural persons and;
a controller which sends said face data as reference face data to said robot via the transceiver, wherein said face data are retrieved from said data base among face data of possible persons who have concurrent presence in an area and time zone with said robot.

* * * * *